United States Patent
Toda et al.

(10) Patent No.: US 8,426,331 B2
(45) Date of Patent: Apr. 23, 2013

(54) DIELECTRIC CERAMIC, AND RESONATOR USING THE SAME

(75) Inventors: Hajime Toda, Kirishima (JP); Toshiyuki Sue, Kirishima (JP)

(73) Assignee: Kyocera Corporation, Kyoto (JP)

( * ) Notice: Subject to any disclaimer, the term of this patent is extended or adjusted under 35 U.S.C. 154(b) by 105 days.

(21) Appl. No.: 13/126,739

(22) PCT Filed: Oct. 28, 2009

(86) PCT No.: PCT/JP2009/068513
§ 371 (c)(1),
(2), (4) Date: Apr. 28, 2011

(87) PCT Pub. No.: WO2010/050514
PCT Pub. Date: May 6, 2010

(65) Prior Publication Data
US 2011/0201491 A1    Aug. 18, 2011

(30) Foreign Application Priority Data

Oct. 30, 2008 (JP) .................................. 2008-279277
Feb. 26, 2009 (JP) .................................. 2009-043886

(51) Int. Cl.
*C04B 35/468* (2006.01)
(52) U.S. Cl.
USPC .......................................................... 501/139
(58) Field of Classification Search .................... 501/139
See application file for complete search history.

(56) References Cited

U.S. PATENT DOCUMENTS

| 5,310,710 | A  | * | 5/1994 | Takase et al. | 501/139 |
| 5,650,368 | A  | * | 7/1997 | Tateishi et al. | 501/139 |
| 8,183,171 | B2 | * | 5/2012 | Arashi et al. | 501/139 |

FOREIGN PATENT DOCUMENTS

| JP | 63-117958 | 5/1988 |
| JP | 04-362061 | 12/1992 |

* cited by examiner

*Primary Examiner* — Karl Group
(74) *Attorney, Agent, or Firm* — DLA Piper LLP (US)

(57) ABSTRACT

Provided is a dielectric ceramic containing yttrium, manganese, and aluminum, and having a composition formula expressed by $\alpha BaO \cdot \beta Nd_2O_3 \cdot \gamma TiO_2$, wherein mole ratios $\alpha$, $\beta$ and $\gamma$ satisfy $14 \leq \alpha \leq 21$, $4 \leq \beta \leq 21$, and $65 \leq \gamma \leq 75$, respectively. In this case, the equation: $\alpha + \beta + \gamma = 100$ is established.

6 Claims, 1 Drawing Sheet

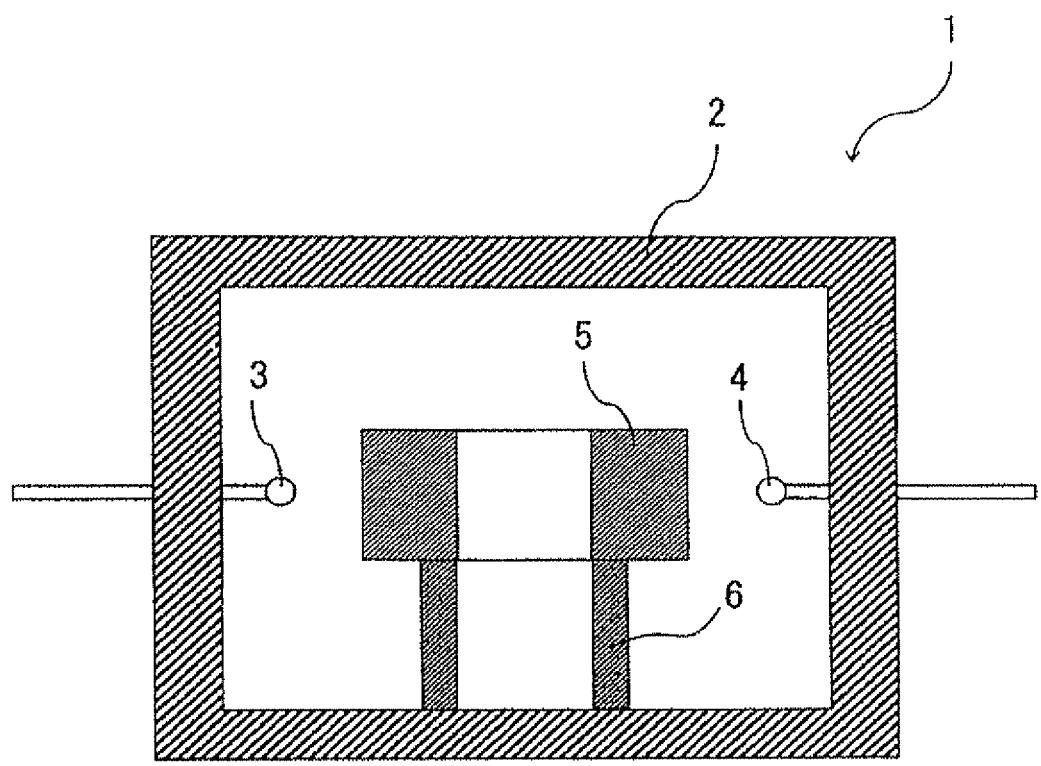

DIELECTRIC CERAMIC, AND RESONATOR USING THE SAME

CROSS-REFERENCE TO THE RELATED APPLICATIONS

This application is a national stage of international application No. PCT/JP2009/068513, filed on Oct. 28, 2009, and claims the benefit of priority under 35 USC 119 to Japanese Patent Application No. 2008-279277, filed on Oct. 30, 2008 and Japanese Patent Application No. 2009-043886, filed on Feb. 26, 2009, the entire contents of all of which are incorporated herein by reference.

TECHNICAL FIELD

The present invention relates to a dielectric ceramic, and a resonator using the same.

BACKGROUND ART

Following upon the recent rapid technological advancement in mobile communication markets such as mobile phones, personal computers, or the like, the characteristics required for components and materials used for such products become increasingly more severe. In general, a dielectric material used for capacitors or the like is required to have a high dielectric constant. The dielectric material is further required to concurrently satisfy various conditions such as a small dielectric loss and a satisfactory temperature coefficient. In recent years, the used frequency is shifted to a higher frequency band due to the diversity of used functions, and the dielectric characteristics particularly in a high frequency range (800 MHz to 2 GHz) have been required.

For example, as a dielectric ceramic exhibiting a dielectric constant of 60 or more, $BaO-Nd_2O_3-TiO_2$ based dielectric ceramic are known.

However, the known $BaO-Nd_2O_3-TiO_2$ based dielectric ceramic fail, to obtain required relative dielectric constant ($\epsilon r$), quality coefficient (Q value) expressed as the reciprocal of dielectric loss, and temperature characteristics ($\tau f$).

Hence, there is a need for the $BaO-Nd_2O_3-TiO_2$ based dielectric ceramic making it possible to obtain a high quality coefficient (Q value) and stable temperature characteristics ($\tau f$) close to zero, while retaining a dielectric constant of 60 or more.

SUMMARY OF THE INVENTION

A $BaO-Nd_2O_3-TiO_2$ based dielectric ceramic according to an embodiment of the present invention has an oxide of the following composition formula, and contains yttrium, manganese, and aluminum.

$\alpha BaO \cdot \beta Nd_2O_3 \cdot \gamma TiO_2$ wherein $14 \leq \alpha \leq 21$, $4 \leq \beta \leq 21$, $65 \leq \gamma \leq 75$, and $\alpha+\beta+\gamma=100$.

A resonator according to an embodiment of the present invention uses the dielectric ceramic as a dielectric material.

The dielectric ceramic, and the resonator using the dielectric ceramic make it possible to achieve a high dielectric constant and a high quality coefficient (Q value), and also stabilize temperature dependency.

BRIEF DESCRIPTION OF THE DRAWINGS

The FIGURE is a partial cross section for schematically showing an example of the resonator according to the embodiment of the present invention.

EMBODIMENTS FOR CARRYING OUT THE INVENTION

An embodiment of the present invention is described below in detail. The dielectric ceramic of the present embodiment has an oxide expressed by composition formula: $\alpha BaO \cdot \beta Nd_2O_3 \cdot \gamma TiO_2$ wherein $14 \leq \alpha \leq 21$, $14 \leq \beta \leq 21$, $65 \leq \gamma \leq 75$, and $\alpha+\beta+\gamma=100$, and contains yttrium, manganese, and aluminum.

In the dielectric ceramic of the present embodiment, the mole ratios $\alpha$, $\gamma$, and $\gamma$ of the individual ingredients are respectively limited to the forgoing ranges for the following reasons. The reason for $14 \leq \alpha \leq 21$ is that the dielectric constant ($\epsilon r$) becomes large, and the quality coefficient (Q value) becomes high, and the absolute value of the temperature coefficient ($\tau f$) of resonance frequency becomes small. Particularly, the lower limit of $\alpha$ is preferably 15, and the upper limit of $\alpha$ is preferably 19. Here, the temperature coefficient ($\tau f$) of resonance frequency indicates a change of resonance frequency with respect to temperature. When the absolute value of the temperature coefficient ($\tau f$) of resonance frequency is small, the temperature dependency of the dielectric ceramic is small, and the characteristics are stable even in an environment subjected to an intense temperature difference.

The reason for $4 \leq \beta \leq 21$ is that the dielectric constant ($\epsilon r$) becomes large, and the quality coefficient (Q value) becomes high, and the absolute value of $\tau f$ becomes small. Particularly, the lower limit of $\beta$ is preferably 11, and the upper limit of $\beta$ is preferably 15.

The reason for $65 \leq \gamma \leq 75$ is that the dielectric constant ($\epsilon r$) becomes large, and the quality coefficient (Q value) becomes high, and the absolute value of if becomes small. Particularly, the lower limit of $\gamma$ is preferably 68, and the upper limit of $\gamma$ is preferably 72.

Preferably, the dielectric ceramic of the embodiment has a composition ratio within the foregoing range, and contains not less than 3 mass % nor more than 9 mass % of yttrium in terms of oxide, and contains 0.5 mass % or less (except for 0 mass %) of manganese in terms of oxide, and contains not less than 0.25 mass % nor more than 1 mass % of aluminum in terms of oxide.

When the yttrium contained in the dielectric ceramic of the present embodiment is not less than 3 mass % nor more than 9 mass % in terms of oxide, it is capable of improving the dielectric constant of the dielectric ceramic and the temperature dependency of resonance frequency.

When the manganese contained in the dielectric ceramic is 0.5 mass % or less (except for 0 mass %) in terms of oxide, oxygen generated by valence change of the oxides of manganese ($MnO$, $MnO_2$, or the like) is sufficiently supplied to oxygen deficiency within the dielectric ceramic. Consequently, it is capable of suppressing a decrease in dielectric constant and an increase in temperature dependency of resonance frequency, which are caused mainly due to occurrence of the oxygen deficiency within the dielectric ceramic.

When the manganese contained in the dielectric ceramic is 0.5 mass % or less in terms of oxide, it is capable of suppressing manganese oxide from acting as impurity, thereby allowing the manganese oxide to sufficiently serve to supply oxygen to lattice defects in the dielectric ceramic. This suppresses the manganese oxide from acting as impurity, and adversely affecting the crystal structure itself of the Ba—Nd—Ti based material. As the result, it is capable of suppressing the occurrence of disadvantages, such as deterioration of mechanical properties of the dielectric ceramic, the decrease of dielectric constant, and the increase of temperature dependency of resonance frequency.

When the aluminum contained in the dielectric ceramic is not less than 0.25 mass % nor more than 1 mass % in terms of oxide, the dielectric ceramic has a temperature coefficient (τf) closer to zero, and further stabilizes the temperature dependency of resonance frequency. The temperature coefficient (τf) is further stabilized when the aluminum content in the dielectric ceramic is not less than 0.25 mass % nor more than 1 mass %.

Preferably, the dielectric ceramic of the present embodiment has a $Ba_{4.5}Nd_9Ti_{18}O_{54}$ crystal. The $Ba_{4.5}Nd_9Ti_{18}O_{54}$ crystal exhibits stable dielectric characteristics. Therefore, the dielectric ceramic containing the crystal can concurrently satisfy a desired dielectric constant (τf) of 60 or more, a high quality coefficient (Q value), and a temperature coefficient (τf) close to zero.

Preferably, the $Ba_{4.5}Nd_9Ti_{18}O_{54}$ crystal has the following lattice constants calculated from an X-ray diffraction chart by Rietveld method. That is, the lattice constant "a" is not less than 22.29 nor more than 22.32, the lattice constant "b" is not less than 7.66 nor more than 7.69, and the lattice constant "c" is not less than 12.14 nor more than 12.17. This optimizes the crystal structure of $Ba_{4.5}Nd_9Ti_{18}O_{54}$ contained in the dielectric ceramic of the present embodiment, thereby improving dielectric characteristics, particularly the value of the quality coefficient (Q value).

The Rietveld method is a method of refining crystal structure parameters by using the X-ray diffraction pattern of a material. The lattice constant is one of the structure parameters. When the structure parameters are calculated by Rietveld method, a crystal structure model is refined by calculating a diffraction strength by using a crystal structure model, and by setting the structure parameters of the structure model so that the calculated diffraction strength and a diffraction strength actually measured by X-ray diffraction become closer to each other as much as possible. The lattice constants calculated by Rietveld method is the lattice constants of the refined structure model.

For example, in the refinement of the lattice constants of titanium oxide ($TiO_2$), firstly, $TiO_2$ powder is prepared as sample, and is sufficiently pulverized and then subjected to X-ray diffraction measurement using a commercially available X-ray diffractometer, After obtaining an X-ray diffraction pattern (an actual measurement value) of the $TiO_2$, pattern analysis is made by using a Rietveld analysis program. In the analysis, the lattice constants are refined together with atomic coordinates. It is therefore necessary to correct X-ray diffraction measurement peak positions by using a standard sample, in order to minimize instrument error. The refinement based on calculation requires a plurality of actual measurement values as initial information, and the atomic coordinates are refined by least-squares method based on the initial information. Crystal structure data of the $TiO_2$ lattice constants and the like (data related to the crystal structure model) are based on JCPDS (joint committee for powder diffraction standards) card. The JCPDS card is edited and issued by International Center for Diffraction Data (ICDD). The general lattice constants of $Ba_{4.5}Nd_9Ti_{18}O_{54}$ are a=22.3479, b=7.6955, and c=12.2021.

In the dielectric ceramic of the present embodiment, the value $I_A/I_C$ is preferably 0.04 or less, wherein $I_A$ is a maximum peak of $Ba_{1.23}Al_{2.46}Ti_{5.5}O_{16}$ crystal in the vicinity of 2θ=28.2° (28.2°±0.1°), and $I_C$ is the peak strength of a maximum peak of $Ba_{4.5}Nd_9Ti_{18}O_{54}$ crystal in the vicinity of 2θ=31.6° (31.6°±0.1°). This dielectric ceramic achieves more highly stable dielectric characteristics as the ratio of the $Ba_{4.5}Nd_9Ti_{18}O_{54}$ crystal is increased. That is, in this dielectric ceramic, the $Ba_{1.23}Al_{2.46}Ti_{5.5}O_{16}$ crystal are a different phase which causes the dielectric characteristics to deteriorate. Hence, the ratio of the $Ba_{1.23}Al_{2.46}Ti_{5.5}O_{16}$ crystal existing as the different phase is preferably low. Thus, when the $I_A/I_C$ is 0.04 or less, it is capable of obtaining the dielectric ceramic achieving more highly stable dielectric characteristics.

The X-ray diffraction chart can be measured in a measurement range 2θ=10°-90° and under CuKα measurement conditions by using, for example, an X-ray diffractometer ("ADVANCE" manufactured by BrukerAXS Inc.). The crystal determination is made based on whether the values of peak angles of a peak existing in the vicinity of 2θ=28.2° (28.2*±0.1°), and a peak existing in the vicinity of 2θ=31.6° (31.6°±0.1°) in the X-ray diffraction chart of the dielectric ceramic are substantially identical to the diffraction angles of $Ba_{1.23}Al_{2.46}Ti_{5.5}O_{16}$ and $Ba_{4.5}Nd_9Ti_{18}O_{54}$ described in the JCPDS card, respectively, that is, based on whether these two values fall within the range ±0.1° with respect to the values of the diffraction angles described in the JCPDS card.

Preferably, the dielectric ceramic of the present embodiment has a void ratio of 4% or less. When the surface and interior of a ceramic body composed of the dielectric ceramic of the present embodiment have the void ratio of 4% or less, a decrease in density of the ceramic body can be suppressed, thereby suppressing a decrease in mechanical strength of the ceramic body. Further, when the void ratio of the ceramic body is 4% or less, it is also capable of suppressing deterioration of electrical properties and variations in electrical properties. This suppresses the ceramic body from being subjected to chipping, crack, damage, or the like, due to impact or the like exerted on the ceramic body during its handling, falling, attachment into the resonator, as well as after its installation into each mobile phone base station or the like. Additionally, when the void ratio of the ceramic body is 3% or less, the mechanical properties and electrical properties are further stabilized.

The void ratio can be calculated as follows. That is, several photographs or images of the surface and interior cross sections in the ceramic body are taken by a metallurgical microscope or SEM adjusted to an optional magnification so that, for example, a range of 100 μm×100 μm can be observed. The photographs or images are analyzed by an image analyzer. In the analysis, the void ratio of the ceramic body is calculated by, for example, calculating the void ratios for several locations by using these photographs or images, and by finding an average value of these calculated void ratios. As the image analyzer, for example, a "LUZEX-FS" manufactured by Nireco Corporation may be used.

The dielectric ceramic of the present embodiment may contain, as unavoidable impurities, a total of 1 mass % or less of Fe, Sr, Na, Ca, K, Si, Pb, Ni, Cu, or Mg in terms of oxide. This suppresses a decrease in the values of various dielectric characteristics, and suppresses deterioration in the mechanical properties as a sintered body. The amount of the unavoidable impurities can be measured by an ICP (inductively coupled plasma) atomic emission spectrometry ("ICPS-8100" manufactured by Simadzu Corporation). Specifically, the amounts of the unavoidable impurities are obtained in the following manner. A part of the dielectric ceramic is pulverized, and the obtained powder is dissolved in an aqueous solution such as hydrochloric acid. Thereafter, the amounts of Fe, Sr, Na, Ca, K, Si, Pb, Ni, Cu, or Mg are measured by using the ICP atomic emission spectrometry, and are converted into oxide. The error of the measurement device is n±√n, wherein n is an analysis value.

Next, a method of manufacturing the dielectric ceramic of the present embodiment is described in detail.

Specifically, the method of manufacturing the dielectric ceramic of the present embodiment includes, for example, the following steps (1) to (5).

(1) Various kinds of high-purity powders of Barium carbonate, neodymium oxide, titanium oxide, yttrium oxide, and aluminum oxide, each having a purity of 99 mass % or more, are prepared as starting materials. The individual kinds of powders are then weighed so as to have their respective desired ratios. Then, a mixture is obtained by adding pure water to these powders, followed by mixing and pulverization in a ball mill using zirconia balls or the like, for 1-50 hours until the mean particle size of each powder becomes 2.0 μm or less.

(2) The mixture is dried and calcined at 1000-1200° C. in atmosphere for 1-10 hours, thereby obtaining a calcined matter.

(3) The obtained calcined matter is lightly crushed. Manganese carbonate having a mean particle size of 2 μm or less, organic binder, and water are added thereto, followed by wet mixing and pulverization in the ball mill using zirconia balls, or the like.

(4) This is then granulated or sized by, for example, a known spray dry method. The obtained granulated body or sized powder is formed into an optional shape by a known forming method, such as die pressing method, or cold isostatic pressing method. The form of the granulated body or sized powder may be not only solid, such as powder, but also a mixture of solid and fluid, such as slurry. In this case, solvent may be fluid other than water, for example, IPA (isopropyl alcohol), methanol, ethanol, toluene, or acetone.

(5) The obtained formed body is sintered at 1300° C.-1450° C. in atmosphere while holding it for exceeding one hour but not exceeding 10 hours. As a shelf plate for sintering, a high-purity zirconia one may be used. Zirconia powder having a mean particle size of 10 μm or less may be spread on the shelf plate for sintering as needed. In order to obtain a desired shape, the obtained sintered body may be subjected to grinding as needed.

Next, an example of the dielectric resonator using the dielectric ceramic of the present embodiment is described. A TE mode dielectric resonator 1 shown in the FIGURE includes a metal case 2, an input terminal 3, an output terminal 4, a ceramic body 5, and a mounting stand 6. The metal case 2 is made of a light metal, such as aluminum. The input terminal 3 and the output terminal 4 are disposed on mutually opposed sides of the inner wall of a metal case 2. The ceramic body 5 is disposed between the input terminal 3 and the output terminal 4 on the mounting stand 6, and is used as a filter. In the dielectric resonator 1, when a microwave is inputted from the input terminal 3, the inputted microwave is trapped within the ceramic body 5 by the reflection at the boundary between the ceramic body 5 and a free space, and causes resonance at a specific frequency. Then, the resonated signal is outputted to the exterior of the metal case 2 by establishing magnetic field coupling with the output terminal 4.

Although not shown, of course, the dielectric ceramic of the present embodiment may be applied to coaxial resonators using TEM mode, stripline resonators, TM mode dielectric ceramic resonators, or other resonators. Alternatively, the input terminal 3 and the output terminal 4 may be directly installed on the ceramic body 5.

The ceramic body 5 is a resonance medium having a predetermined shape composed of the dielectric ceramic of the present embodiment. The shape of the ceramic body 5 may be any one of rectangular parallelepiped, cube, plate-like shape, disk, cylinder, polygonal prism, or other resonantable three-dimensional shapes. The frequencies of inputted high frequency signals are approximately 500 MHz to 500 GHz. Approximately 2 GHz to 80 GHz are practically preferred as resonance frequencies.

The dielectric ceramic according to the present embodiment is also usable for antenna sharing devices.

The dielectric ceramic according to the present embodiment has a high dielectric constant $\epsilon r$ (a ratio with dielectric constant $\epsilon 0$ of vacuum) and high resonance sharpness (quality coefficient) Q value in the high frequency range including microwave and/or millimeter wave, or the like. Hence, the dielectric ceramic are usable in materials for various resonators used in a high frequency range (for example, 500 MHz to 500 GHz), dielectric substrate materials for MICs (monolithic ICs), materials for dielectric waveguide, or dielectric materials for stacked ceramic capacitors. The resonators using the dielectric ceramic are particularly used for mobile phone base station filters in a frequency band of 800 MHz or above.

Example 1

Appropriate compositions for the dielectric ceramic of the present invention were examined.

Firstly, powders of $BaCO_3$, $Nd_2O_3$, $TiO_2$, $Y_2O_3$, $Al_2O_3$, each having a purity of 99.9 mass %, were prepared as starting materials. These kinds of powders were weighed according to their respective compositions, and these weighed powders were mixed together. Water was then added to the mixed powder, and this was pulverized and calcined at a temperature of 1100° C. in atmosphere for two hours. Further, $MnCO_3$, an adequate amount of organic binder, and water were added to the calcined matter. This was pulverized with zirconia balls, and was then granulated by spray drying. At a press pressure of 1000 kg/cm², the granulated raw material was press-formed into a disk-like formed body of 12 mmΦ×10 mmt (thickness).

Subsequently, the formed body was sintered in atmosphere at temperatures of 1300-1450° C. for two hours. Finally, the sintered body obtained by sintering was ground into a disk shape of approximately 9 mmΦ×6 mmt (thickness), resulting in Samples Nos. 1-32.

Next, the dielectric characteristics of these samples were measured. That is, dielectric constant $\epsilon r$, quality coefficient (Q value), and temperature coefficient $\tau f$ of resonance frequency were respectively measured by dielectric cylindrical resonator method (Internal Standard IEC61338-1-3 (1999)) at a measuring frequency of 800 MHz. The Q value was converted to a quality coefficient (Q value) at 4 GHz, from the relationship: (quality coefficient Q)×(measuring frequency f)=constant, which is generally established in microwave dielectric bodies. Regarding the temperature coefficient of resonance frequency, the temperature coefficient ($\tau f$) at 25-85° C. was calculated with reference to the resonance frequency at 25° C.

TABLE 1

| Sample No. | BaO α (mol %) | Nd$_2$O$_3$ β (mol %) | TiO$_2$ γ (mol %) | Y$_2$O$_3$ (mass %) | Al$_2$O$_3$ (mass %) | MnCO$_3$ (mass %) | Dielectric constant ∈r | Quality coefficient Q | Temperature coefficient τf |
|---|---|---|---|---|---|---|---|---|---|
| *1 | 13.5 | 16.5 | 70 | 6 | 0.8 | 0.2 | 65.0 | 6411 | 2.1 |
| 2 | 14 | 16 | 70 | 6 | 0.8 | 0.2 | 71.0 | 7692 | 5.4 |
| 3 | 15 | 15 | 70 | 6 | 0.8 | 0.2 | 72.2 | 8010 | 7.7 |
| 4 | 19 | 11 | 70 | 6 | 0.8 | 0.2 | 73.1 | 8294 | 9.8 |
| 5 | 21 | 9 | 70 | 6 | 0.8 | 0.2 | 74.7 | 8560 | 14.5 |
| *6 | 21.5 | 8.5 | 70 | 6 | 0.8 | 0.2 | 74.5 | 8781 | 20.6 |
| *7 | 21.5 | 3.5 | 75 | 6 | 0.8 | 0.2 | 70.3 | 9064 | 40.2 |
| 8 | 17 | 8 | 75 | 6 | 0.8 | 0.2 | 71.3 | 8660 | 5.0 |
| 9 | 17 | 11 | 71 | 6 | 0.8 | 0.2 | 78.2 | 9201 | 8.8 |
| 10 | 17 | 14 | 69 | 6 | 0.8 | 0.2 | 77.3 | 9174 | 5.7 |
| 11 | 17 | 15 | 68 | 6 | 0.8 | 0.2 | 75.3 | 8805 | 2.3 |
| 12 | 13 | 21 | 66 | 6 | 0.8 | 0.2 | 70.4 | 7591 | 4.5 |
| *13 | 14 | 21.5 | 65 | 6 | 0.8 | 0.2 | 66.2 | 5947 | 8.0 |
| *14 | 17 | 18.5 | 64.5 | 6 | 0.8 | 0.2 | 70.0 | 7178 | 20.4 |
| 15 | 17 | 18 | 65 | 6 | 0.8 | 0.2 | 71.2 | 7492 | 14.5 |
| 16 | 17 | 11 | 72 | 6 | 0.8 | 0.2 | 72.0 | 8314 | 3.5 |
| 17 | 14.5 | 11 | 74.5 | 6 | 0.8 | 0.2 | 71.1 | 8594 | −0.1 |
| *18 | 14 | 10.5 | 75.5 | 6 | 0.8 | 0.2 | 69.8 | 6423 | 16.5 |
| *19 | 17 | 13 | 70 | 2.5 | 0.8 | 0.2 | 73.8 | 9504 | 31.8 |
| 20 | 17 | 13 | 70 | 3 | 0.8 | 0.2 | 74.1 | 9193 | 13.3 |
| 21 | 17 | 13 | 70 | 9 | 0.8 | 0.2 | 78.4 | 7502 | 10.0 |
| *22 | 17 | 13 | 70 | 9.5 | 0.8 | 0.2 | 78.8 | 6211 | 3.0 |
| *23 | 17 | 13 | 70 | 6 | 0.2 | 0.2 | 78.1 | 6452 | 12.4 |
| 24 | 17 | 13 | 70 | 6 | 0.25 | 0.2 | 77.9 | 6548 | 11.7 |
| 25 | 17 | 13 | 70 | 6 | 1 | 0.2 | 78.2 | 6931 | 10.1 |
| *26 | 17 | 13 | 70 | 6 | 1.5 | 0.2 | 62.5 | 6321 | −3.1 |
| 27 | 17 | 13 | 70 | 6 | 0.8 | 0.05 | 70.2 | 8163 | −1.0 |
| 28 | 17 | 13 | 70 | 6 | 0.8 | 0.5 | 76.2 | 7652 | 14.6 |
| *29 | 17 | 13 | 70 | 6 | 0.8 | 0.6 | 74.5 | 7401 | 15.3 |
| *30 | 17 | 13 | 70 | 0 | 0.8 | 0.2 | 70.9 | 10957 | 48.0 |
| *31 | 17 | 13 | 70 | 6 | 0 | 0.2 | 83.2 | 7731 | 33.0 |
| *32 | 17 | 13 | 70 | 6 | 0.8 | 0 | 75.1 | 6112 | 3.0 |

Symbol "*" in the table denotes the composition values and performance values thereof in the samples of comparative examples different from examples.

Based on the results, when α was 13.5 (No. 1), the quality coefficient Q is 6411 that was a low value. When α was 21.5 (No. 6), the temperature coefficient τf was 20.6 that was a large positive value. When α was 21.5, and β was 3.5 (No. 7), the temperature coefficient τf was 40.2 that was a large positive value. When β was 21.5 (No. 13), the quality coefficient Q was 5947 that was a low value. When γ was 64.5 (No. 14), the temperature coefficient τf was 20.4 that was a large positive value. When γ was 75.5 (No. 18), the quality coefficient Q was 6423 that was low, and the temperature coefficient τf was 16.5 that was a large positive value.

When the amount of addition of Y$_2$O$_3$ was 2.5 mass % (No. 19), the temperature coefficient τf was 31.8 that was a large positive value. When the amount of addition of Y$_2$O$_3$ was 9.5 mass % (No. 22), the quality coefficient Q value was 6211 that was a low value. When the amount of addition of Al$_2$O$_3$ was 0.2 mass % (No. 23), the quality coefficient Q value was 6452 that was a low value. When the amount of addition of Al$_2$O$_3$ was 1.5 mass % (No. 26), the quality coefficient Q value was 6321 that was a low value. When the amount of addition of MnCO$_3$ was 0.6 mass % (No. 29), the temperature coefficient τf was 15.3 that was a large positive value. When the amount of addition of Y$_2$O$_3$ was 0.0 mass % (No. 30), the temperature coefficient τf was 48.0 that was a large positive value. When the amount of addition of Al$_2$O$_3$ was 0.0 mass % (No. 31), the temperature coefficient τf was 33.0 that was a large positive value. When the amount of addition of MnCO$_3$ was 0.0 mass % (No. 32), the quality coefficient Q was 6112 that was a low value.

Compared to these samples, Samples Nos. 2-5, 8-12, 15-17, 20, 21, 24, 25, 27, and 28 had a specific dielectric constant value of 60-80, and a quality coefficient Q value of 6500 or more, and an absolute value of temperature coefficient τf of 15 or less.

Among others, Samples Nos. 3, 4, 9-11, and 16 indicated satisfactory values, namely, 8000 or more in the quality coefficient Q value, and 10 or less in the absolute value of the temperature coefficient if, because their values α, β, and γ were in the ranges of 15-19, 14-21, and 68-72, respectively. Further, in Samples Nos. 9-11, and 16, the values of β and γ were in more satisfactory ranges of 14-21, and 68-72, respectively. Therefore, these samples had satisfactory values fulfilling either one of the condition where the quality coefficient Q value was 9000 or more, and the condition where the temperature coefficient τf was 5 or less and close to zero.

Example 2

Next, appropriate lattice constants of main ingredients of the dielectric ceramic were examined.

Firstly, powders of BaCO$_3$, Nd$_2$O$_3$, TiO$_2$, Y$_2$O$_3$, Al$_2$O$_3$, each having a purity of 99.9 mass %, were prepared as starting materials. These kinds of powders were weighed according to their respective compositions, and these weighed powders were mixed together. Water was then added to the mixed powder, and this was pulverized and calcined at a temperature of 1100° C. in atmosphere for two hours. Further, MnCO$_3$, an adequate amount of organic binder, and water were added to the calcined matter. This was pulverized with zirconia balls, and then granulated by spray drying. At a press pressure of 1000 kg/cm$^2$, the granulated raw material was press-formed into a disk-like formed body of 12 mmΦ×10 mmt (thickness).

Subsequently, the formed body was sintered in atmosphere at temperatures of 1300-1450° C. for two hours, and then was ground into a disk shape of approximately 9 mmΦ×6 mmt (thickness), resulting in Samples Nos. 33-40.

Next, X-ray diffraction measurements of these samples were carried out in a measurement range of 2θ=10°-90° and under CuKα measurement condition by using an X-ray diffractometer ("X'PertPRO" manufactured by PANalytical Inc.). Thereafter, the analysis of the lattice constants of $Ba_{4.5}Nd_9Ti_{18}O_{54}$ was carried out using the Rietveld analysis program RIETAN. The lattice constant measurements were carried out by adding a standard sample Si to each sample in order to more accurately obtain the lattice constants. In the analysis of the lattice constants, the measurements were carried out by fixing the lattice constant of the standard sample Si to a=5.43119°.

Further, the dielectric characteristics of each sample were measured. Specifically, the dielectric constant εr, quality coefficient Q value, and temperature coefficient τf of resonance frequency were measured by the cylindrical resonator method at a measuring frequency of 800 MHz. The Q value was converted to a Q value at 4 GHz, from the relationship: (Q value)×(measuring frequency f)=constant, which is generally established in microwave dielectric bodies. Regarding the temperature coefficient of resonance frequency, the temperature coefficient τf at 25-85° C. was calculated with reference to the resonance frequency at 25° C.

These results were shown in Table 2.

ficient τf were 10 or less. Thus it was found that dielectric characteristics were improved when the lattice constant value "a" was in the range of not less than 22.29 nor more than 22.32, and the value "b" was in the range of not less than 7.66 nor more than 7.69, and the value "c" was in the range of not less than 12.14 nor more than 12.17.

Example 3

Next, the effect of addition of $Al_2O_3$ into the dielectric ceramic was examined.

Firstly, powders of $BaCO_3$, $Nd_2O_3$, $TiO_2$, $Y_2O_3$, $Al_2O_3$, each having a purity of 99.9 mass %, were prepared as starting materials. These kinds of powders were weighed according to their respective compositions, and these weighed powders were mixed together. Water was then added to the mixed powder, and this was pulverized and calcined at a temperature of 1100° C. in atmosphere for two hours. Further, $MnCO_3$, an adequate amount of organic binder, and water were added to the calcined matter. This was pulverized with zirconia balls, and then granulated by spray drying. At a press pressure of 1000 kg/cm², the granulated raw material was press-formed into a disk-like formed body of 12 mmΦ×10 mmt (thickness).

Subsequently, the formed body was sintered in atmosphere at temperatures of 1300-1450° C. for two hours. The obtained sintered body was then ground into a disk shape of approximately 9 mmΦ×6 mm (thickness), resulting in Samples Nos. 41-45.

TABLE 2

| Sample No. | BaO α (mol %) | $Nd_2O_3$ β (mol %) | $TiO_2$ γ (mol %) | $Y_2O_3$ (mass %) | $Al_2O_3$ (mass %) | $MnCO_3$ (mass %) | Lattice constants of $Ba_{4.5}Nd_9Ti_{18}O_{54}$ | | | Dielectric characteristics | | |
|---|---|---|---|---|---|---|---|---|---|---|---|---|
| | | | | | | | a | b | c | Dielectric constant εr | Quality coefficient Q | Temperature coefficient τf |
| 33 | 17.0 | 13.0 | 70.0 | 7.5 | 0.25 | 0.2 | 22.333 | 7.686 | 12.166 | 79.3 | 6521 | 14.9 |
| 34 | 17.0 | 13.0 | 70.0 | 3.0 | 0.8 | 0.2 | 22.304 | 7.679 | 12.177 | 74.6 | 9220 | 13.4 |
| 35 | 17.0 | 13.0 | 70.0 | 4.0 | 0.8 | 0.2 | 22.318 | 7.675 | 12.169 | 73.0 | 9504 | 10.0 |
| 36 | 17.0 | 13.0 | 70.0 | 5.0 | 0.8 | 0.2 | 22.304 | 7.665 | 12.151 | 73.3 | 9193 | 8.2 |
| 37 | 17.0 | 13.0 | 70.0 | 7.0 | 0.8 | 0.2 | 22.296 | 7.661 | 12.144 | 69.0 | 8360 | 3.1 |
| 38 | 17.0 | 13.0 | 70.0 | 8.0 | 0.8 | 0.2 | 22.308 | 7.664 | 12.141 | 77.6 | 7502 | 1.5 |
| 39 | 17.0 | 13.0 | 70.0 | 9.0 | 0.8 | 0.2 | 22.300 | 7.652 | 12.156 | 78.3 | 6542 | −2.7 |
| 40 | 17.0 | 13.0 | 70.0 | 7.0 | 1.0 | 0.2 | 22.282 | 7.655 | 12.137 | 60.8 | 9422 | −3.4 |

The following were noted from Table 2. In Sample No. 33 where the value of the lattice constant "a" indicated 22.333, the quality coefficient Q was 6521 that was a rather low value, and the temperature coefficient τf was 14.9 that was a rather large value. In Sample No. 34 where the value of the lattice constant "c" indicated 12.177, the temperature coefficient τf was 13.4 that was a rather large value. In Sample No. 39 where the value of the lattice constant "b" indicated 7.652, the quality coefficient Q was 6542 that was a rather low value. In Sample No. 40 where the value of the lattice constant "a" indicated 22.282, the value of the lattice constant "b" indicated 7.655, and the value of the lattice constant "c" indicated 12.137, the dielectric constant εr was 60.8 that was a rather low value.

Compared to these samples, Samples Nos. 35-38 had the lattice constant values in the following ranges. That is, the value "a" was not less than 22.29 nor more than 22.32, and the value "b" was not less than 7.66 nor more than 7.69, and the value "c" was not more than 12.14 nor more than 12.17. Their respective specific inductive capacities were 69-78, and their respective quality coefficient Q values were 7000 or above, and their respective absolute values of the temperature coef- The dielectric characteristics of each sample were measured. Specifically, the dielectric constant εr, quality coefficient Q value, and temperature coefficient τf of resonance frequency were measured by the cylindrical resonator method at a measuring frequency of 800 MHz. The Q value was converted to a Q value at 4 GHz, from the relationship: (Q value)×(measuring frequency f)=constant, which is generally established in microwave dielectric bodies. Regarding the temperature coefficient of resonance frequency, the temperature coefficient τf at 25-85° C. was calculated with reference to the resonance frequency at 25° C.

The X-ray diffraction of each sample was carried out in a measurement range 2θ=10°-90° and under CuKα measurement conditions by using the X-ray diffractometer ("ADVANCE" manufactured by BrukerAXS Inc.). From the X-ray diffraction chart obtained by the X-ray diffraction, the value of peak strength of a maximum peak $I_A$ of $Ba_{1.23}Al_{2.46}Ti_{5.5}O_{16}$ crystal in the vicinity of 2θ=28.2°, and the value of peak strength of a maximum peak $I_c$ of $Ba_{4.5}Nd_9Ti_{18}O_{54}$ crystal in the vicinity of 2θ=31.6° were found, and the value $I_A/I_C$ was calculated. These results were shown in Table 3.

TABLE 3

| Sample No. | BaO α (mol %) | Nd2O3 β (mol %) | TiO2 γ (mol %) | Y₂O₃ (mass %) | Al₂O₃ (mass %) | MnCO₃ (mass %) | $I_A$ | $I_C$ | $I_A/I_C$ | Dielectric characteristics | | |
|---|---|---|---|---|---|---|---|---|---|---|---|---|
| | | | | | | | | | | Dielectric constant ∈r | Quality coefficient Q | Temperature coefficient τf |
| 41 | 16.5 | 14 | 69.5 | 6.5 | 0.25 | 0.2 | 339 | 17160 | 0.0198 | 80.6 | 8709 | +10.2 |
| 42 | 16.5 | 14 | 69.5 | 6.5 | 0.5 | 0.2 | 494 | 16192 | 0.0305 | 77.6 | 9438 | +6.8 |
| 43 | 16.5 | 14 | 69.5 | 6.5 | 0.75 | 0.2 | 552 | 16834 | 0.0328 | 74.3 | 9608 | +3.2 |
| 44 | 16.5 | 14 | 69.5 | 6.5 | 1 | 0.2 | 561 | 16138 | 0.0348 | 72.1 | 9239 | −0.3 |
| 45 | 16.5 | 14 | 69.5 | 6.5 | 1.25 | 0.2 | 654 | 15892 | 0.0411 | 68.2 | 7800 | −2.2 |

The following were noted from Table 3. That is, in Samples Nos. 41-44 where the amount of addition of Al₂O₃ was not less than 0.25 mass % nor more than 1.0 mass %, their respective values $I_A/I_C$ were 0.04 or less, and their respective dielectric constants ∈r were 70 or more, and their respective quality coefficient Q values were 8000 or more, and their respective absolute values of temperature coefficient τf were 15 or less. Particularly, it was confirmed that the temperature coefficient τf was in the range of −0.3 to 10.2, and had stable values including values close to zero. In Sample No. 45, the value $I_A/I_C$ exceeded 0.04, and the dielectric constant was 68.2 that was a lower value, and the quality coefficient Q value was 7800 that was a lower value, compared with other Samples Nos. 41-44.

Example 4

Next, the void ratio of the dielectric ceramic of the present invention was examined.

Firstly, powders of BaCO₃, Nd₂O₃, TiO₂, Y₂O₃, Al₂O₃, each having a purity of 99.9 mass %, were prepared as starting materials. These kinds of powders were weighed according to their respective compositions, and these weighed powders were mixed together. Water was then added to the mixed powder, and this was pulverized and calcined at a temperature of 1100° C. in atmosphere for two hours. Further, MnCO₃, an adequate amount of organic binder, and water were added to the calcined matter. This was pulverized with zirconia balls, and then granulated by spray drying. At a press pressure of 1000 kg/cm², the granulated raw material was press-formed into a disk-like formed body of 12 mmΦ×10 mmt (thickness).

Subsequently, the formed body was sintered in atmosphere at temperatures of 1250-1450° C. for two hours. Finally, the sintered body was ground into a disk shape of approximately 9 mmΦ×6 mmt (thickness), resulting in Samples Nos. 46-50.

The dielectric characteristics of the individual samples 46-50 were measured. Specifically, the dielectric constant ∈r, quality coefficient Q value, and temperature coefficient τf of resonance frequency were respectively measured by the cylindrical resonator method at a measuring frequency of 800 MHz. The Q value was converted to a Q value at 4 GHz, from the relationship: (Q value)×(measuring frequency f)=constant, which is generally established in microwave dielectric bodies. Regarding the temperature coefficient of resonance frequency, the temperature coefficient τf at 25-85° C. was calculated with reference to the resonance frequency at 25° C.

Further, photographs were taken after adjusting a metallurgical microscope so that a range of 100 μm×100 μm at several optional locations in each sample surface could be observed at an optional magnification. The void ratios of these several optional locations were calculated by analyzing the images of these photographs by using an image analyzer ("LUZEX-FS" manufactured by Nireco Corporation). Finally, the void ratios of the individual samples were calculated by averaging these void ratios. These results were shown in Table 4.

TABLE 4

| Sample No. | BaO α (mol %) | Nd₂O₃ β (mol %) | TiO₂ γ (mol %) | Y₂O₃ (mass %) | Al₂O₃ (mass %) | MnCO₃ (mass %) | Sintering temperature (° C.) | Void ratio (%) | Dielectric characteristics | | |
|---|---|---|---|---|---|---|---|---|---|---|---|
| | | | | | | | | | Dielectric constant ∈r | Quality coefficient Q | Temperature coefficient τf |
| 46 | 17.5 | 12.5 | 70 | 6.5 | 0.5 | 0.2 | 1280 | 5.0 | 65.8 | 6978 | 3.2 |
| 47 | 17.5 | 12.5 | 70 | 6.5 | 0.5 | 0.2 | 1300 | 4.0 | 69.8 | 7432 | 4.8 |
| 48 | 17.5 | 12.5 | 70 | 6.5 | 0.5 | 0.2 | 1350 | 3.0 | 72.1 | 7767 | 5.1 |
| 49 | 17,5 | 12.5 | 70 | 6.5 | 0.5 | 0.2 | 1400 | 1.2 | 72.6 | 7892 | 5.7 |
| 50 | 17.5 | 12.5 | 70 | 6.5 | 0.5 | 0.2 | 1450 | 0.5 | 72.7 | 7911 | 6.8 |

It was confirmed from Table 4 that all of Samples Nos. 47-50 had a void ratio of 4.0% or less, and a dielectric constant ∈r of 68 or more, and a quality coefficient Q value of 7000 or more, and an absolute value of temperature coefficient τf of 15 or less. In Sample No. 46, the void ratio exceeded 4.0%, and the dielectric constant ∈r was 65.8 that was a lower value, and the quality coefficient Q value was 6978 that was a lower value, compared with other Samples Nos. 47-50.

The invention claimed is:

1. A dielectric ceramic comprising an oxide of the following composition formula:

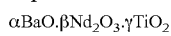

$\alpha BaO \cdot \beta Nd_2O_3 \cdot \gamma TiO_2$ wherein $14 \leq \alpha \leq 21$, $4 \leq \beta \leq 21$, $65 \leq \gamma \leq 75$, and $\alpha+\beta+\gamma=100$, and containing not less than 3 mass % nor more than 9 mass % of yttrium in terms of $Y_2O_3$, 0.5 mass % or less (except for 0 mass %) of manganese in terms of $MnCO_3$, and not less than 0.25 mass % nor more than 1 mass % of aluminum in terms of $Al_2O_3$, and a crystal of $Ba_{4.5}Nd_9Ti_{18}O_{54}$.

2. The dielectric ceramic according to claim 1, wherein the values of $\alpha$, $\beta$ and $\gamma$ are $15 \leqq \alpha \leqq 19$, $14 \leqq \beta \leqq 21$, and $88 \leqq \gamma \leqq 72$, respectively.

3. The dielectric ceramic according to claim 1, wherein lattice constants a, b, and c of the crystal, which are calculated from an X-ray diffraction chart by Rietveld method, satisfy the following inequalities:

$22.29 \leqq a \leqq 22.32$;

$7.66 \leqq b \leqq 7.69$; and $12.14 \leqq c \leqq 12.17$.

4. The dielectric ceramic according to claim 3, wherein in the X-ray diffraction chart, a value of $I_A/I_C$ is 0.04 or less where $I_A$ represents maximum peak strength of $Ba_{1.23}Al_{2.46}Ti_{5.5}O_{16}$ crystal of $2\theta = 28.1\text{-}28.3°$ and $I_C$ represents maximum peak strength of $Ba_{4.5}Nd_9Ti_{18}O_{54}$ crystals of $2\theta = 31.5\text{-}31.7°$.

5. The dielectric ceramic according to claim 1, wherein a void percentage is 4% or less.

6. A resonator comprising the dielectric ceramic according to claim 1 as a dielectric material.

\* \* \* \* \*